(12) United States Patent
Justen et al.

(10) Patent No.: US 10,201,033 B2
(45) Date of Patent: Feb. 5, 2019

(54) METHOD AND SYSTEM FOR MANAGING NETWORK TRAFFIC

(71) Applicant: Alcatel Lucent, Boulogne-Billancourt (FR)

(72) Inventors: Pascal Justen, Kalken (BE); Christele Bouchat, Antwerp (BE); Erwin Six, Kalken (BE)

(73) Assignee: Alcatel Lucent, Boulogne Billancourt (FR)

( * ) Notice: Subject to any disclaimer, the term of this patent is extended or adjusted under 35 U.S.C. 154(b) by 26 days.

(21) Appl. No.: 15/501,993

(22) PCT Filed: Aug. 24, 2015

(86) PCT No.: PCT/EP2015/069302
§ 371 (c)(1),
(2) Date: Feb. 6, 2017

(87) PCT Pub. No.: WO2016/030303
PCT Pub. Date: Mar. 3, 2016

(65) Prior Publication Data
US 2017/0223765 A1 Aug. 3, 2017

(30) Foreign Application Priority Data
Aug. 28, 2014 (EP) .................................. 14306326

(51) Int. Cl.
*H04L 12/28* (2006.01)
*H04L 12/64* (2006.01)
(Continued)

(52) U.S. Cl.
CPC ......... *H04W 76/19* (2018.02); *H04L 12/2834* (2013.01); *H04L 12/6418* (2013.01); *H04W 76/10* (2018.02); *H04W 88/16* (2013.01)

(58) Field of Classification Search
CPC ............ H04B 7/18528; H04B 7/18571; H04B 7/18576; H04W 84/06; H04W 40/26;
(Continued)

(56) References Cited

U.S. PATENT DOCUMENTS 7,734,908 B1 * 6/2010 Kung ................ H04L 29/06027
370/338
7,843,901 B2 * 11/2010 Silver ................... H04W 76/10
370/352

(Continued)

FOREIGN PATENT DOCUMENTS

EP        2259191 A1    12/2010
JP    2003-318992 A    11/2003
(Continued)

OTHER PUBLICATIONS

International Search Report PCT/ISA/210 for International Application No. PCT/EP2015/069302 dated Nov. 3, 2015.
(Continued)

*Primary Examiner* — Sharad Rampuria
(74) *Attorney, Agent, or Firm* — Harness, Dickey & Pierce, P.L.C.

(57) ABSTRACT

A method for managing network traffic between one or more user equipment devices in a private network and a server outside the private network via a private gateway, a server gateway and a connection therebetween. The server gateway acts as a router and the private gateway acts as a bridge. The method including monitoring the connection between the private gateway and the server gateway; in the event of loss of connection, switching the private gateway from a bridge operation mode to a minimal service mode; repeating the previous method steps; in case of retrieved connection, switching the private gateway from the minimal service mode back to the bridge operation mode; and repeating the previous method steps. The private gateway provides mini- (Continued)

mal routing services to allow data traffic in the private network to continue in the minimal service mode.

15 Claims, 6 Drawing Sheets

(51) Int. Cl.
     *H04W 76/10*          (2018.01)
     *H04W 76/19*          (2018.01)
     *H04W 88/16*          (2009.01)

(58) Field of Classification Search
     CPC ..... H04L 12/64; H04L 12/6418; H04L 12/66; H04L 29/06; H04L 29/06326; H04M 7/006; H04Q 2213/13209; H04Q 2213/13176; H04Q 2213/13204
     See application file for complete search history.

(56) References Cited

U.S. PATENT DOCUMENTS

| | | | |
|---|---|---|---|
| 2002/0009078 A1* | 1/2002 | Wilson | H04L 12/2856 370/389 |
| 2002/0026528 A1 | 2/2002 | Lo | |
| 2006/0142010 A1* | 6/2006 | Tom | H04Q 3/0045 455/445 |
| 2008/0205417 A1 | 8/2008 | Li | |
| 2010/0070636 A1 | 3/2010 | Skog et al. | |
| 2011/0044347 A1 | 2/2011 | Taylor et al. | |
| 2012/0134308 A1* | 5/2012 | Yamada | H04L 12/2834 370/310 |
| 2012/0265889 A1 | 10/2012 | Skog et al. | |
| 2012/0320761 A1 | 12/2012 | Taylor et al. | |
| 2014/0233580 A1 | 8/2014 | Taylor et al. | |

FOREIGN PATENT DOCUMENTS

| | | |
|---|---|---|
| JP | 2007-158769 A | 6/2007 |
| JP | 2012-114844 A | 6/2012 |
| JP | 2014-086763 A | 5/2014 |

OTHER PUBLICATIONS

Written Opinion of the International Searching Authority PCT/ISA/237 for International Application No. PCT/EP2015/069302 dated Nov. 3, 2015.

* cited by examiner

METHOD AND SYSTEM FOR MANAGING NETWORK TRAFFIC

TECHNICAL FIELD

The present invention relates to the field of networking. In particular, it relates to a method and system for managing network traffic between one or more user equipment devices in a private network and a server outside the private network via a private gateway, a server gateway and a connection therebetween.

BACKGROUND

Nowadays, almost everyone has a personal computer, laptop, tablet and/or mobile phone. Commonly, these user equipment devices are equipped with hardware for connecting to a computer network, such as a local area network set up at home or at work, also known as a private network. Private networks are usually connected to a wide area network, which is typically a server in the World Wide Web, via a private router, also known as a private gateway, which sends and routes data packets within and between networks.

In general, two main parts can be distinguished in the private gateway architecture: a control plane and a data plane. The control plane contains routing protocols to discover the overall network topology and draw a routing table, which defines what to do with incoming data packets. The data plane forwards data packets based on the routing and forwarding information of the control plane protocols. Together, they route the network traffic between a private network and another network. More specifically, private gateways commonly have a Dynamic Host Configuration Protocol (DHCP) server, which assigns IP addresses to the user equipment devices in the private network, which simplifies the configuration network configuration, and contain a Network Address Translation (NAT) function, which allows connecting multiple devices to the network using only one IP address. In addition, modern private gateways comprise functions for security, logging, network storage, media services, smart home control and often contain a firewall.

Private gateways can be intelligent and complex devices and a wide variety of different models are available on the market. Both this diversity and complexity can make the implementation of new service features difficult (and expensive). Furthermore, service providers tend to reduce their operational and capital expenditure and increase their revenues by offering more services. For service providers, it can be more attractive to virtualize private network services, i.e. to run them elsewhere, for example at a server somewhere in the World Wide Web. Such virtualization has multiple advantages. The locally installed equipment can be much simpler and it allows updating services without locally updating networking equipment. The drawback of moving functionality to the server, however, is that when the private gateway and server gateway get disconnected, the main services are lost as well. Currently, the functionality is located at the private gateway and all services are still available in the private network, even if the connection to the server is down. To prevent loss of services it has been proposed to provide the private gateway with a fall-back connection to the Internet, such as Wi-Fi or GSM (3G/4G) in case the main connection to the Internet, such as by glass fibre or cable, is lost.

SUMMARY

It is an objective of the present invention to simplify the above-mentioned proposed solution.

To this end, the invention relates to a method as claimed in claim 1. More specifically, according to the invention, there is provided a method for managing network traffic between one or more user equipment devices in a private network and a server outside the private network via a private gateway, a server gateway and a connection therebetween, wherein the server gateway acts as a router performing routing for the private network, and the private gateway acts as a bridge forwarding data traffic between the user equipment devices and the server gateway, comprising the steps of:

(i) monitoring the connection between the private gateway and the server gateway;
(ii) in the event of loss of connection between the private gateway and the server gateway, switching the private gateway from a bridge operation mode to a minimal service mode, which provides minimal routing services to allow data traffic in the private network to continue;
(iii) repeating the method from step (i);
(iv) in case of retrieved connection between the private gateway and the server gateway, switching the private gateway from the minimal service mode back to the bridge operation mode; and
(v) repeating the method from step (i).

In this way, most of the networking and service functions of the private gateway, conventionally provided by the control plane and data plane of the private gateway, are shifted to the server gateway, which can either be a physical networking device or a virtual function on a server in the World Wide Web, or a combination of both. In other words, the private network is extended outside the customer premises and service functions such as network mapping and IP address assignment are provided by a control plane located on the server gateway. In this configuration, the private gateway located at the private network side is configured to act as a bridge, which means it basically only forwards data to the server gateway and does not provide control plane or complex data plane services. This allows the private gateway architecture to be much simpler and it allows updating services without locally updating networking equipment. Particularly, when the server delivers a service to multiple individual private networks, it is easier to update the server than to update each of the individual private networks. The drawback of moving functionality to the server, however, is that when the private gateway and server gateway get disconnected, the main services are lost as well. One way to overcome this drawback is by switching the private gateway from a bridge operation mode to a minimal service mode, wherein said minimal service mode provides basic service functions, such as IP address assignment for new and timed-out devices, Wi-Fi control, Wi-Fi authentication and quality of service requirement based prioritization.

According to a preferred embodiment, the method further comprises synchronizing a register on the private gateway with a register on the server gateway, wherein said registers comprise a configuration value that contains the minimum required information for the private gateway to operate in case of loss of connection between the private gateway and the server gateway. Synchronization provides an up-to-date configuration value, which is required to boot and minimally operate the private gateway in the event the private gateway and the server gateway get disconnected.

In another preferred embodiment, the method further comprises connecting the one or more user equipment devices in the private network to an other user equipment device in the private network after switching to the minimal service mode in the event of loss of connection between the private gateway and the server gateway, wherein said other user equipment device connects to the server through a connection different from the connection between the private gateway and the server gateway, therewith establishing an alternative connection between the private network and the server. In this way, access to the server is retrieved, which allows network traffic to continue between the private network and the server. In addition, it comprises switching the private gateway from the minimal service mode to a sleep state mode, wherein said sleep state mode includes monitoring the connection between the private network and server.

According to another preferred embodiment, the private gateway detects the eventual loss of connection between the private gateway and the server gateway either passively or actively. Passive monitoring is performed by a connection monitor on the private gateway, which only detects if there is data traffic from and to the server. Active monitoring comprises sending test data to a connection monitor responder on the server gateway, wherein said responder responds to the connection monitor on the private gateway if it receives the test data packets.

According to yet another preferred embodiment, the private gateway controls the set-up of the connection between the one or more user equipment devices and the other user equipment device. Alternatively, in a preferred embodiment, the other user equipment device in the private network acts as a bridge between the private gateway and the server gateway.

According to a preferred embodiment, the other user equipment device in the private network acts as a bridge between the one or more user equipment devices and the server gateway. Thereby, the other user equipment device takes over the bridging services from the private gateway. Basically, it becomes the private gateway for the disconnected user equipment devices. In this embodiment, the server gateway will continue to provide control plane services for the network traffic.

According to another preferred embodiment, the other user equipment device in the private network connects wirelessly to the server gateway.

In a further preferred embodiment, the method further comprises connecting the one or more user equipment devices in the private network to the private gateway in case of retrieved connection, wherein the private gateway switches from sleep state mode to bridge operation mode and connects to the server gateway, therewith re-establishing the connection between the private network and the server.

The invention further relates to a system for managing network traffic between one or more user equipment devices in a private network and a server outside the private network via a private gateway, a server gateway and a connection therebetween, wherein the server gateway acts as a router performing routing for the private network, and the private gateway acts as a bridge allowing data traffic between the user equipment devices and the server gateway, wherein said system comprises:
  (i) a connection monitor; and
  (ii) a connection monitor controlled switch for switching the private gateway from a bridge operation mode to a minimal service mode which provides minimal routing services to allow traffic in the private network to continue in the event of connection loss, and for switching the private gateway from the minimal service mode back to the bridge operation mode in case of retrieved connection.

This system gives access to a much simpler private gateway and allows updating services without locally updating networking equipment. Particularly, when the server delivers a service to multiple individual private networks, it is easier to update the server than to update each of the individual private networks.

According to a preferred embodiment, the system further comprises registers and synchronizing means for synchronizing a register on the private gateway with a register on the server gateway, wherein said registers comprise a configuration value that contains the minimum required information for the private gateway to operate in case of loss of connection between the private gateway and the server gateway. Synchronization provides an up-to-date configuration value, which is required to boot and minimally operate the private gateway in the event the private gateway and the server gateway get disconnected.

According to another preferred embodiment, the system further comprises one or more other user equipment devices in the private network and means for connecting the one or more user equipment devices in the private network to the one or more other user equipment devices in the private network after switching to the minimal service mode in the event of loss of connection, wherein said one or more other user equipment devices in the private network are configured to connect to the one or more user equipment devices in the private network and to connect to the server through a connection different from the connection between the private gateway and the server gateway, therewith configured to establish an alternative connection between the private network and the server. In this way, access to server can be retrieved, which allows network traffic to continue between the private network and the server. Moreover, the embodiment preferably comprises means for switching the private gateway from the minimal service mode to a sleep state mode, wherein said sleep state mode includes monitoring the connection between the private network and server.

Alternatively, in a preferred embodiment, said one or more other user equipment devices in the private network are configured to wirelessly connect to the server gateway.

BRIEF DESCRIPTION OF THE DRAWINGS

The present invention is further illustrated by the following Figures, which show preferred embodiments of the method and system according to the invention, and are not intended to limit the scope of the invention in any way, wherein.

DETAILED DESCRIPTION

Figure 1:
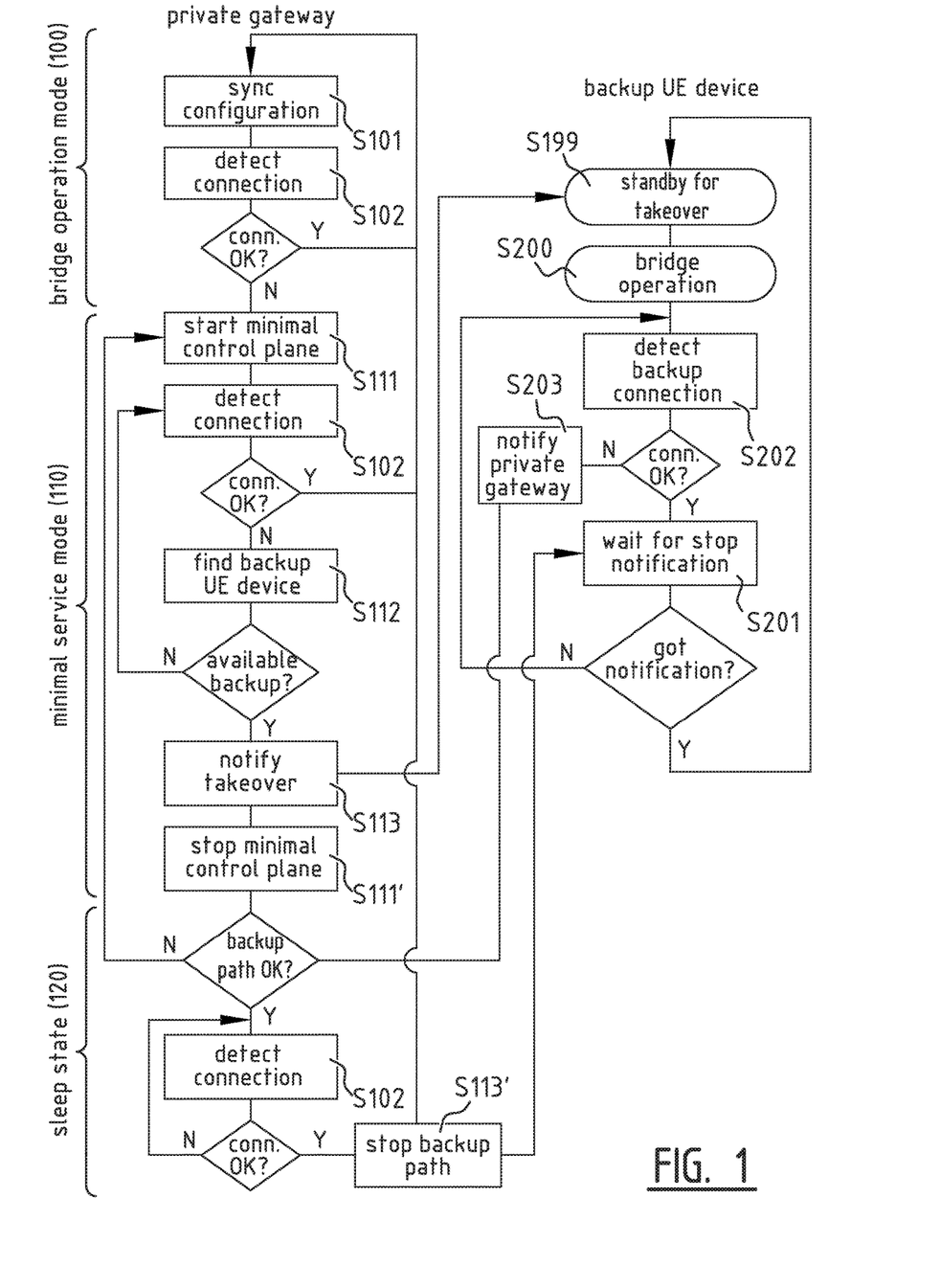
FIG. 1 is a flow chart illustrating the different modes of operation of a private gateway in a method for managing network traffic.

FIG. 1 is a flow chart illustrating the different modes of operation of a private gateway in a method for managing network traffic between one or more user equipment devices in a private network and a server outside the private network via a private gateway, a server gateway and a connection therebetween, wherein the server gateway acts as a router performing routing for the private network, and the private gateway acts as a bridge, indicated by 100, allowing data traffic between the user equipment devices and the server gateway. To ensure that the private gateway can continue to operate in the event of loss of connection between the private gateway and the server gateway, a register on the private gateway containing a minimal configuration is continuously synchronized with the a register of the server gateway, which step is indicated by S101. Next to synchronization, the private gateway continuously monitors the connection between the private gateway and the server gateway, indicated by S102. If the private gateway and server gateway are actively connected, the private gateway continues to synchronize its configuration register (S101) with that of the server gateway and keeps on monitoring the connection. In the event the connection between the private gateway and the server gateway is lost, the connection monitor, which is part of the private gateway, starts (110) the minimal service mode of the private gateway, which initiates (S111) the minimal control plane on the private gateway. This minimal control plane provides basic service functions, such as IP address assignment for new and timed-out devices, Wi-Fi control, Wi-Fi authentication and quality of service requirement based prioritization. At the same time, the private gateway keeps monitoring (S102) the connection to the server gateway and switches back to normal bridge operation in case the connection is retrieved.

Alternatively, according to another aspect of the present invention, if the connection remains lost, the private gateway starts searching (S112) for back-up user equipment (back-up UE) devices in the private network which can (wirelessly) connect to the server and establish a back-up connection between the private network and the server. If there is no back-up UE device available, the private gateway continues to operate in said minimal service mode. In case there is a back-up UE device available, the private gateway notifies (S113) the waiting (S119) back-up UE device of the take-over of the bridging services from the private gateway. From then on, the back-up UE device acts as a bridge for the user equipment devices which lost connection with the server, wherein said bridge operation is indicated by S200. After successful take-over of the bridging services from the private gateway, the connection monitor stops the minimal control plane (S111') on the private gateway, the private gateway switches to a sleep state (120), wherein it keeps monitoring (S102) whether there is an active connection between the private gateway and the server gateway, and the back-up device continues to act as a bridge until it gets notified not to do so, for example in case the connection monitor detects retrieved connection between the private gateway and server gateway. At the same time, the back-up device monitors (S202) his connection to the server gateway and alerts (S203) the private gateway in case the back-up device loses connection with the server gateway. In this case, the private gateway switches from sleep state 120 back to the minimal service mode 110. If the back-up connection is up, the back-up device continues to act as a bridge and waits (S201) for a stop notification from the private gateway in case of retrieved connection between the private gateway and the server gateway Then, the private gateway stops the back-up path (S113') by notifying the back-up UE device of the retrieved connection and by switching back to normal bridge operation.

Figure 2:
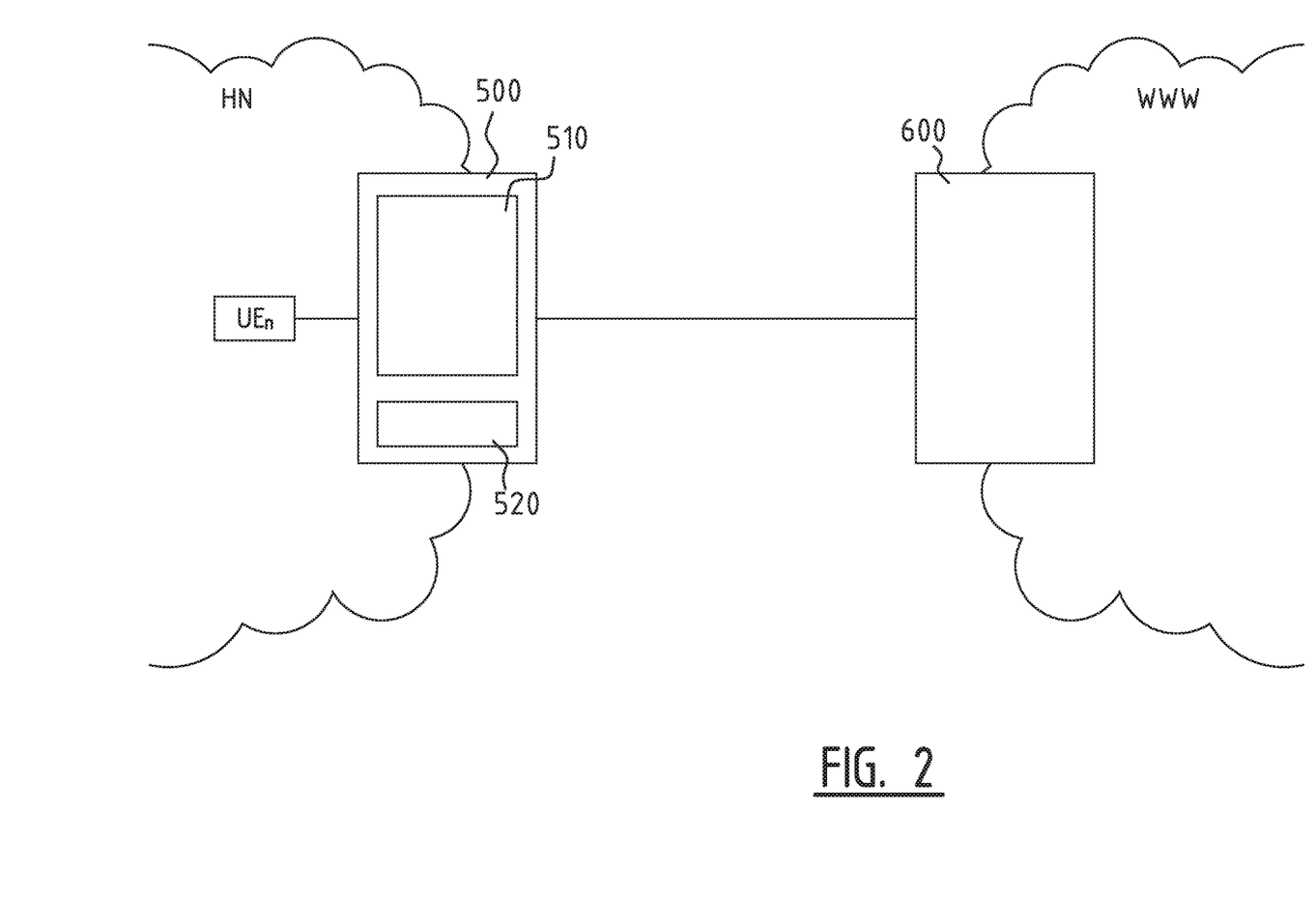
FIG. 2 schematically illustrates a private network HN connected to a server in the WWW, according to the prior art.

FIG. 2 schematically illustrates a private network HN connected to a server in the World Wide Web (WWW), according to the prior art. Private networks are used for multiple purposes, e.g. for setting up a home network or small business network, and are characterized by their limited geographical coverage. One or more user equipment devices $UE_n$ can connect to the private network HN via wired or wireless connections when the user equipment devices $UE_n$ reside in the geographical area that is covered by the private network HN. On the left hand side, FIG. 2 shows one or more user equipment devices $UE_n$ in the private network. The private gateway 500 is equipped with means to recognize predetermined user equipment devices and to assign predetermined parameters to the user equipment devices and to manage private services, such as network attached device control and data storage. It allows data traffic and provides data traffic control via respectively its data plane 520 and control plane 510. On the right hand side, FIG. 2 shows a server gateway or server access node 600, which basically acts as a gateway to the server in the WWW.

In prior art private networks, the private gateway must be configured correctly to assign rights and restrictions to the user equipment devices and to implement private services. Recent trends have shown that certain services, such as online document storage, can be easily outsourced to the server. It is an objective of the present invention to relocate routing services, conventionally provided by the control plane and data plane on the private gateway, to the server gateway. This way, the private network is extended outside the customer premises and service functions such as network mapping are provided by a control plane located on the server gateway. The private gateway located at the private network side is configured to act as a bridge, which means it basically only forwards data to the server gateway and does not provide control plane services.

Figure 3:
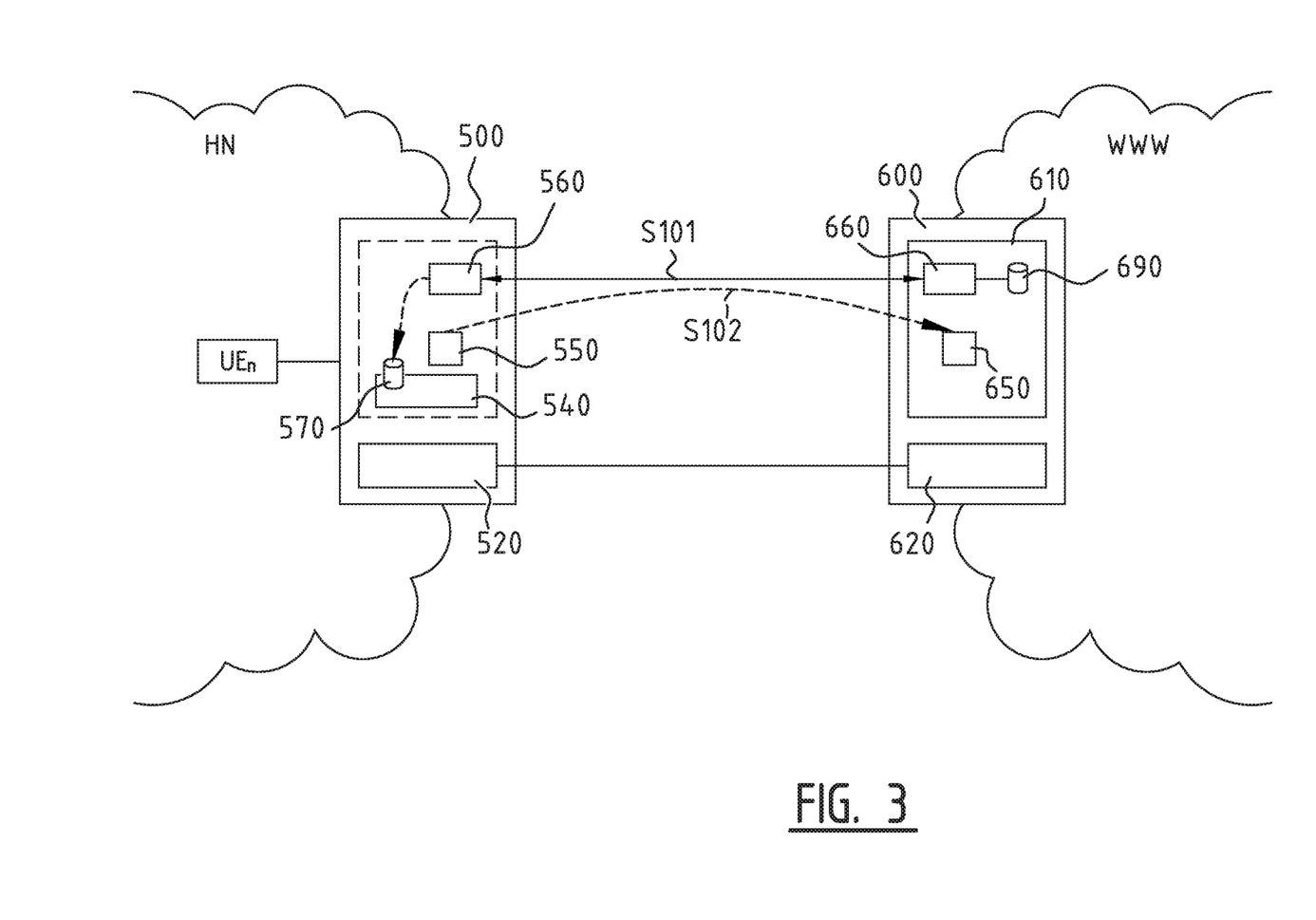
FIG. 3 illustrates an embodiment of the invention, wherein one or more user equipment devices in a private network are connected through a private gateway and a server gateway to a server outside the private network.

FIG. 3 illustrates an embodiment of the invention, wherein one or more user equipment devices $UE_n$ in a private network HN are connected through a private gateway 500 and a server gateway 600 to a server in the WWW outside the private network HN. In this embodiment, routing is substantially performed by the full control plane 610 of the server gateway 600, and the private gateway 500 only operates a slave control plane 540, whereby the private gateway 500 essentially acts as a bridge that forwards data through the data planes 520 and 620 of the private gateway 500 and the server gateway 600 respectively, from the private network HN to the server. To ensure that the private gateway 500 can provide basic services in the event of loss of connection between the private gateway 500 and the server gateway 600, the configuration register 570 of the private gateway 500 is continuously synchronized (S101) by the configuration synchronizers 560 and 660 of the private gateway 500 and server gateway 600 respectively, with the configuration register 690 of the server gateway 600. In addition, the connection between the private gateway 500 and the server gateway 600 is continuously monitored by the connection monitor 550, located on the private gateway 500.

If the private gateway 500 and server gateway 600 are actively connected, the configuration synchronizers 560 and 660 continue to synchronize the configuration register 570 with the configuration register 690 and the connection monitor 550 keeps on monitoring the connection. According to one preferred embodiment, the connection is passively monitored by the connection monitor 550, which entails monitoring traffic that is already on the network. According to another preferred embodiment, the connection is actively monitored (S102) by means of the connection monitor 550 and a connection monitor responder 650 on the server gateway 600, which involves injecting test traffic onto the network and monitoring the flow of that traffic.

Figure 4:
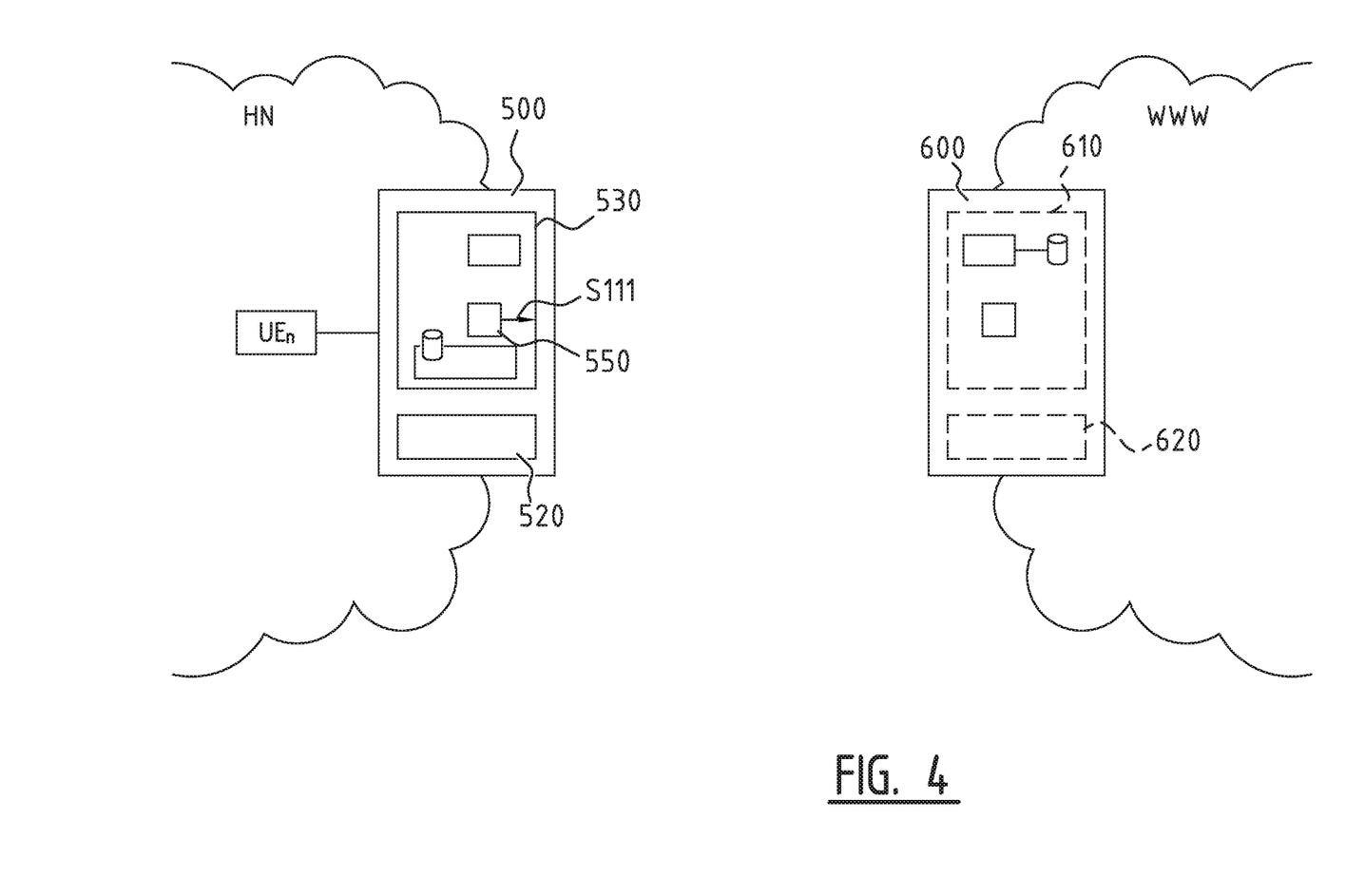
FIG. 4 illustrates an embodiment of the invention in the situation that the connection between the private gateway and the server gateway is lost.

FIG. 4 illustrates an embodiment of the invention in the situation that the connection between the private gateway 500 and the server gateway 600 is lost. In case of connection loss, the connection monitor 550, which is part of the private gateway 500, detects that the active link is down and starts the minimal service mode of the private gateway 500, which initiates (S111) the minimal control plane 530 on the private gateway 500. Together with the data plane 520, the minimal control plane 530 provides basic service functions such as IP address assignment for new and timed-out devices, Wi-Fi control, Wi-Fi authentication and quality of service requirement based prioritization, by means of which communication between the one ore more user equipment devices $UE_n$ in the private network HN can continue.

Figure 5:
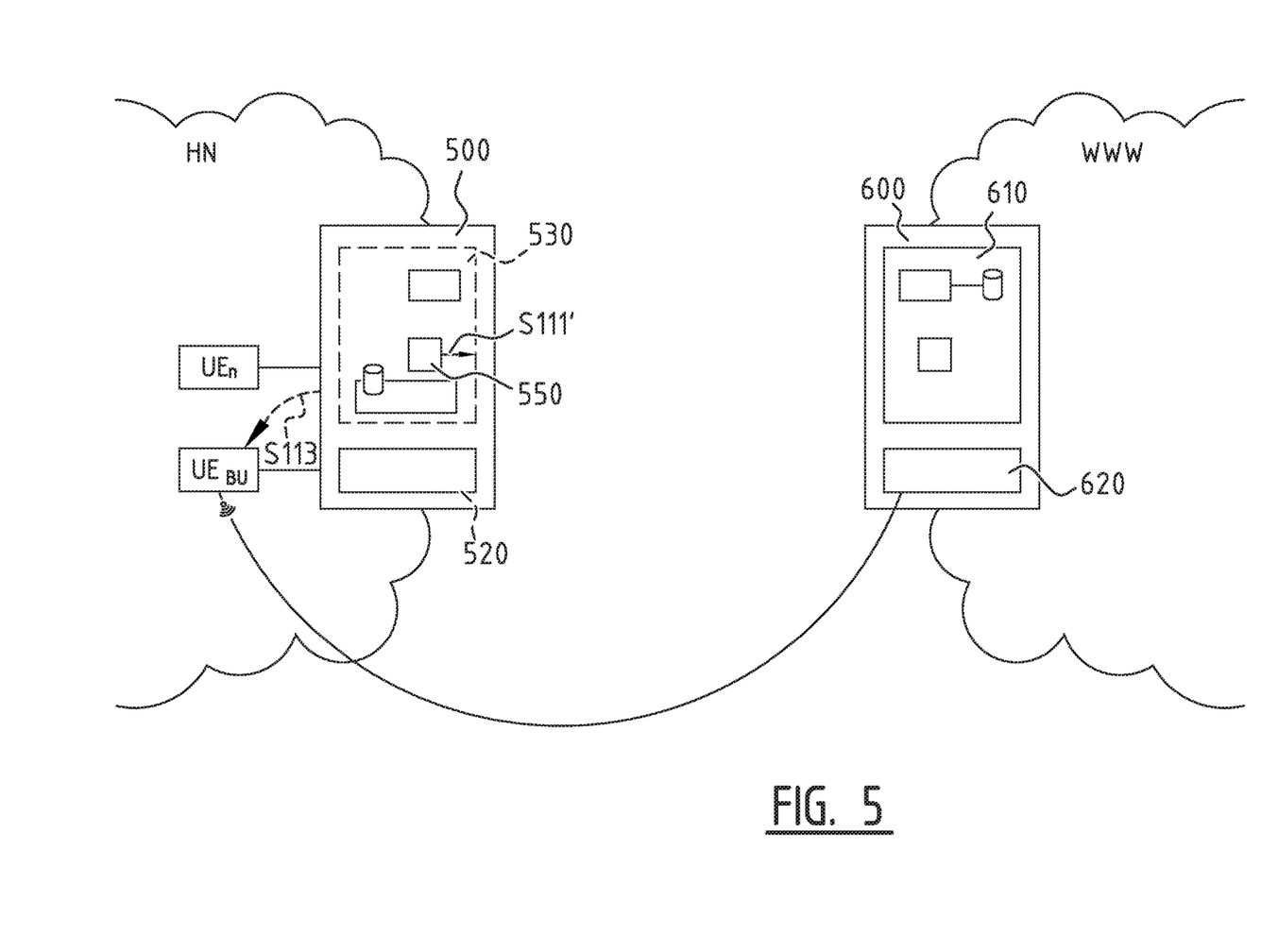
FIG. 5 illustrates another aspect of a preferred embodiment of the present invention, wherein in case of connection loss an other user equipment device in the private network connects to the server and re-establishes an active connection between the private network and the server.

FIG. 5 illustrates another preferred embodiment of the present invention wherein the eventual connection loss is passively detected by the connection monitor 550 on the private gateway 500. In case of connection loss, the private gateway 500 starts searching for another user equipment device in the private network HN, in the FIGS. 5-7 referred to as back-up user equipment device $UE_{BU}$, which can (wirelessly) connect to the server in the WWW and re-establish an active connection between the private network HN and the server. If there is no back-up user equipment device $UE_{BU}$ available, the private gateway 500 continues to operate in said minimal service mode. In case there is a back-up user equipment device $UE_{BU}$ available, the private gateway notifies (S113) the back-up user equipment device $UE_{BU}$, which takes over bridging services from the private gateway 500, thereby taking over the functionality from 520. From then on, the back-up user equipment device $UE_{BU}$ acts as a bridge between the private gateway 500 and the server gateway 600, or as a second bridge for network traffic between the user equipment devices $UE_n$ and the server gateway 600. The routing protocols are continued to be provided by the control plane 610 of the server gateway 600. After successful take-over of the bridging services from the private gateway 500, the connection monitor 550 stops (S111') the minimal control plane 530 on the private gateway 500 and the back-up user equipment device $UE_{BU}$ continues to act as a bridge until it gets notified not to do so, for example in case the connection monitor 550 detects retrieved connection between the private gateway 500 and server gateway 600. Until then, it waits for a stop notification. After successful take-over, the private gateway 500 switches to a sleep state, wherein it at least keeps monitoring whether there is an active connection between the private gateway 500 and the server gateway 600. If the connection remains lost, the connection monitor 550 on the private gateway 500 keeps on monitoring and the back-up user equipment device $UE_{BU}$ continues to act as a bridge connecting the private network HN to the server. In case of retrieved connection, the private gateway 500 stops the back-up path by notifying the one or more user equipment devices and the back-up user equipment device $UE_{BU}$ of the retrieved connection and by switching back to normal bridge operation.

Figure 6:
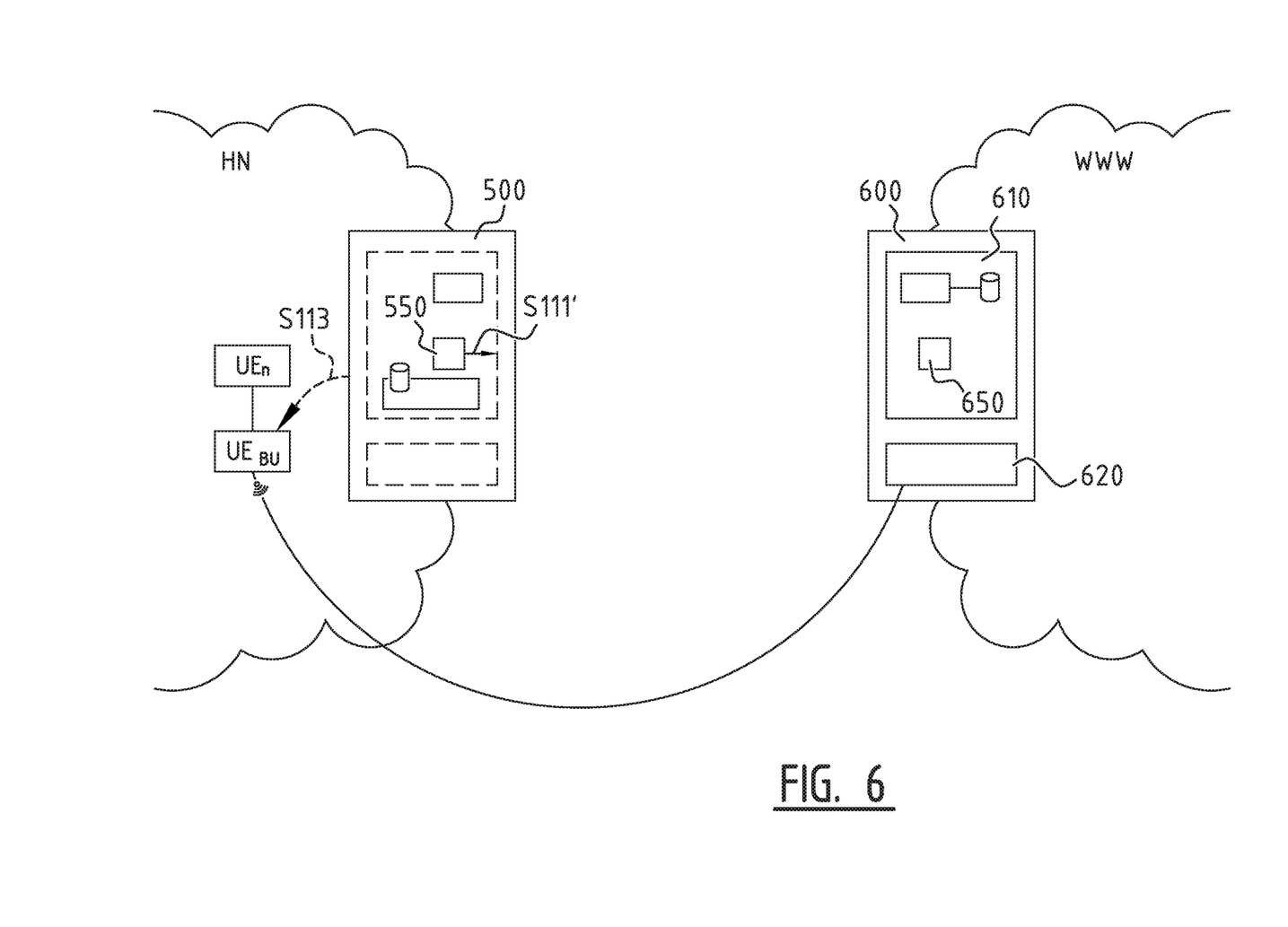
FIG. 6 illustrates another embodiment of the invention, wherein the eventual connection loss is detected by the server gateway and the other user equipment device takes over the bridge functionality from the private gateway.

FIG. 6 illustrates another embodiment of the present invention, wherein the eventual connection loss is actively detected by both the connection monitor 550 on the private gateway 500 and the connection monitor responder 650 on the server gateway 600. In case of connection loss, the private gateway 500 starts searching for a back-up user equipment device $UE_{BU}$ in the private network HN which can (wirelessly) connect to the server in the WWW and establish a back-up connection between the private network HN and the server. If there is no back-up user equipment device $UE_{BU}$ available, the private gateway 500 continues to operate in the minimal service mode. In case there is a back-up user equipment device $UE_{BU}$ available, the private gateway 500 notifies (S113) the back-up user equipment device $UE_{BU}$, which takes over all services from the private gateway 500, thereby taking over full functionality from the private gateway 500 and re-establishing the connection between the one or more user equipment devices $UE_n$ in the private network HN and the server gateway. As the back-up user equipment device $UE_{BU}$ acts as a bridge, the routing protocols are provided by the control plane 610 of the server gateway 600. After successful take-over of the bridging services from the private gateway 500, the connection monitor 550 stops the minimal control plane 530 on the private gateway 500 and the back-up user equipment device $UE_{BU}$ continues to act as a bridge until it gets notified not to do so, for example in case the connection monitor responder 650 detects retrieved connection between the private gateway 500 and server gateway 600. Until then, the back-up user equipment device $UE_{BU}$ waits for a stop notification. After successful take-over, the private gateway 500 switches to a sleep state, wherein it at least keeps monitoring whether there is an active connection between the private gateway 500 and the server gateway 600. If the connection remains lost, the connection monitor 550 and the connection monitor responder 650 keep on monitoring and the back-up user equipment device $UE_{BU}$ continues to act as a bridge connecting the private network HN to the server. In case of retrieved connection, the private gateway 500 stops the back-up path by notifying the one or more user equipment devices and the back-up user equipment device $UE_{BU}$ of the retrieved connection and by switching back to normal bridge operation.

The present invention is not limited to the embodiments shown, but extends also to other embodiments falling within the scope of the appended claims.

The invention claimed is:

1. A method for managing network traffic between one or more user equipment devices in a private network and a server outside the private network via a private gateway, a server gateway and a connection therebetween, wherein the server gateway acts as a router performing routing for the private network, and the private gateway acts as a bridge forwarding data traffic between the user equipment devices and the server gateway, comprising the steps of:
   (i) monitoring the connection between the private gateway and the server gateway;
   (ii) in response to the monitoring detecting loss of connection between the private gateway and the server gateway, switching, by the private gateway, the private gateway from a bridge operation mode to a minimal service mode, the private gateway providing minimal routing services to the user equipment in the minimal service mode during the loss of connection;

(iii) repeating the method from step (i);
(iv) in response to retrieved connection between the private gateway and the server gateway, switching the private gateway from the minimal service mode back to the bridge operation mode; and
(v) repeating the method from step (i).

2. Method according to claim 1, further comprising synchronizing a register on the private gateway with a register on the server gateway, wherein said registers comprise a configuration value that contains minimum required information, the minimum required information being information used by the private gateway to operate in case of loss of connection between the private gateway and the server gateway.

3. Method according to claim 1, further comprising:
connecting the one or more user equipment devices in the private network to an other user equipment device in the private network after switching to the minimal service mode in the event of loss of connection between the private gateway and the server gateway, wherein said other user equipment device connects to the server through a connection different from the connection between the private gateway and the server gateway, therewith establishing an alternative connection between the private network and the server; and
switching the private gateway from the minimal service mode to a sleep state mode, wherein said sleep state mode includes monitoring the connection between the private network and server.

4. Method according to claim 1, wherein the private gateway detects the eventual loss of connection between the private gateway and the server gateway either using passive monitoring or active monitoring.

5. Method according to claim 3, wherein the private gateway controls the set-up of the connection between the one or more user equipment devices and the other user equipment device.

6. Method according to claim 3, wherein the other user equipment device in the private network acts as a bridge between the private gateway and the server gateway.

7. Method according to claim 3, wherein the other user equipment device in the private network acts as a bridge between the one or more user equipment devices and the server gateway.

8. Method according to claim 3, wherein the other user equipment device in the private network connects wirelessly to the server gateway.

9. Method according to claim 3, further comprising:
connecting the one or more user equipment devices in the private network to the private gateway in case of retrieved connection, wherein
the private gateway switches from sleep state mode to bridge operation mode and connects to the server gateway, therewith re-establishing the connection between the private network and the server.

10. System for managing network traffic between one or more user equipment devices in a private network and a server outside the private network via a private gateway, a server gateway and a connection therebetween, wherein the server gateway acts as a router performing routing for the private network, and the private gateway acts as a bridge allowing data traffic between the user equipment devices and the server gateway, wherein said system comprises:
(i) a connection monitor configured to detect loss of connection and retrieved connection; and
(ii) a connection monitor controlled switch configured to, in response to the connection monitor detecting loss of connection, switch the private gateway from a bridge operation mode to a minimal service mode, the minimal service mode providing minimal routing services to allow traffic in the private network to continue in the event of connection loss, and configured to switch the private gateway from the minimal service mode back to the bridge operation mode in response to the connection monitor detecting retrieved connection.

11. System according to claim 10, further comprising:
registers and synchronizing means configured to synchronize a register on the private gateway with a register on the server gateway, wherein said registers comprise a configuration value that contains minimum required information, the minimum required information being information used by the private gateway to operate in case of loss of connection between the private gateway and the server gateway.

12. System according to claim 10, further comprising:
one or more other user equipment devices in the private network and means for connecting the one or more user equipment devices in the private network to the one or more other user equipment devices in the private network after switching to the minimal service mode in the event of loss of connection, wherein said one or more other user equipment devices in the private network are configured to connect to the one or more user equipment devices in the private network and to connect to the server through a connection different from the connection between the private gateway and the server gateway and thereby establish an alternative connection between the private network and the server.

13. System according to claim 12, wherein said one or more other user equipment devices connected to the private network are configured to act as a bridge between the private gateway and the server gateway.

14. System according to claim 12, wherein said one or more other user equipment devices connected to the private network are configured to act as a bridge between the one or more user equipment devices and the server gateway.

15. System according to claim 12, wherein said one or more other user equipment devices in the private network are configured to wirelessly connect to the server gateway.

* * * * *